Nov. 19, 1935.   F. SBICCA ET AL   2,021,811
SOLE CUTTING AND SPLITTING MACHINE
Filed Sept. 17, 1934   8 Sheets-Sheet 6
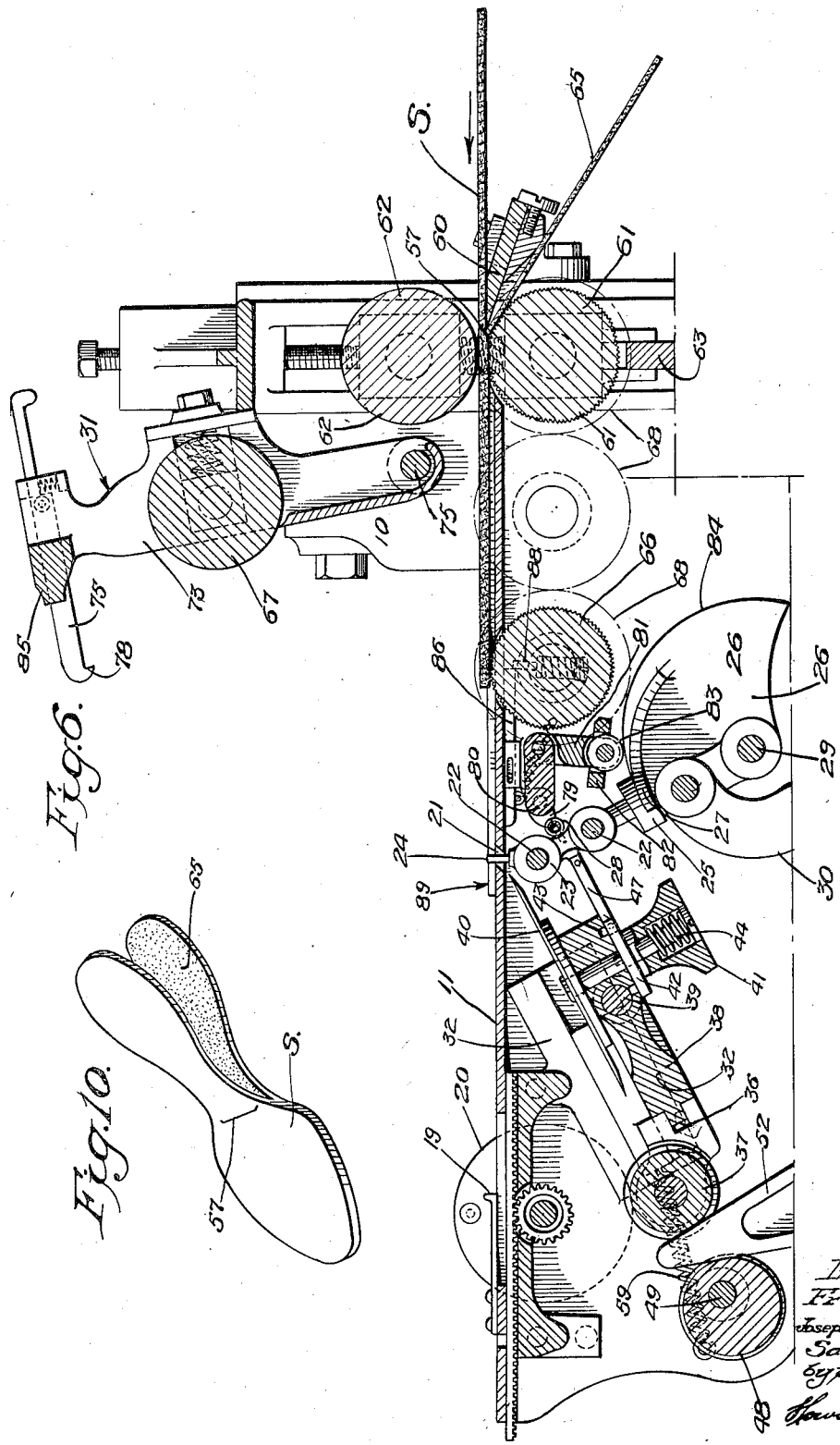

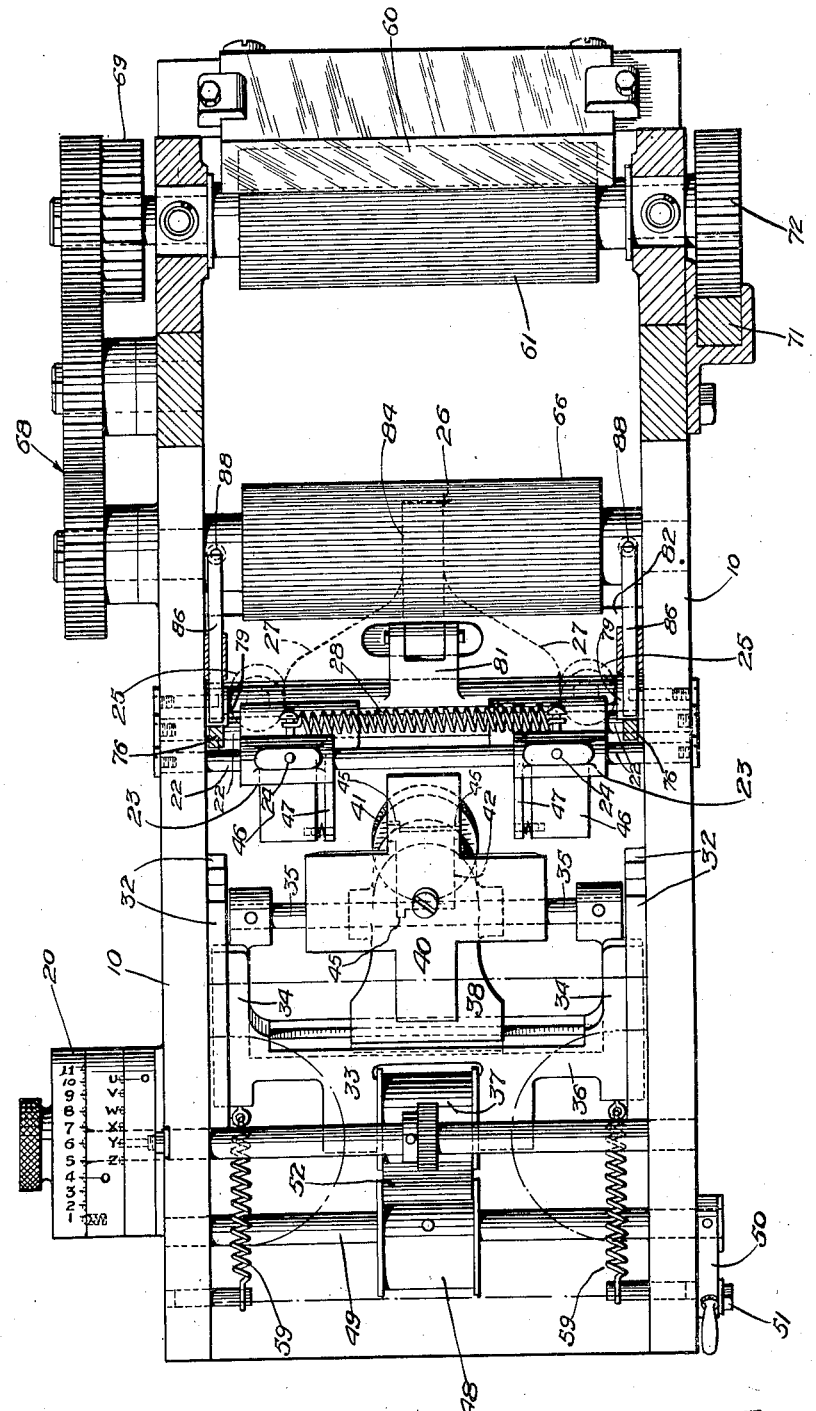

Nov. 19, 1935.    F. SBICCA ET AL    2,021,811
SOLE CUTTING AND SPLITTING MACHINE
Filed Sept. 17, 1934    8 Sheets-Sheet 8

Inventors:—
Frank Sbicca
Joseph T. Yovanovich
Sante Baroni
by their Attorneys
Howson & Howson Patented Nov. 19, 1935

2,021,811

UNITED STATES PATENT OFFICE 2,021,811

SOLE CUTTING AND SPLITTING MACHINE

Frank Sbicca, Manoa, and Joseph T. Yovanovich and Sante Baroni, Philadelphia, Pa., assignors to Sbicca-Method Shoes Incorporated, Philadelphia, Pa., a corporation of Delaware Application September 17, 1934, Serial No. 744,440

18 Claims. (Cl. 12—17)

This invention relates to sole slashing and splitting machines, and more particularly to a machine for carrying out the operations of splitting and slashing necessary in carrying out the method described in the prior patent of Frank Sbicca, dated March 21, 1933, No. 1,902,725, for Method of producing complementary insole-outsole combinations.

An important object of the invention is the improvement of a machine for this purpose described in the prior application of Frank Sbicca, et al., Ser. #666,046, filed April 13, 1933, for Shoe machine, and more specifically, the improvement of the structure of said application to provide a better coordination of the cutting and splitting operations and to provide a machine which is more conveniently operable.

A further object of the invention is the provision of a novel and improved mechanism for controlling the relation of the slashing knife to the sole whereby proper centering of the knife with relation to the sole is automatically effected while still permitting the sole to be placed upon a bed which constitutes its support while cutting in a variety of transversely spaced positions on such bed.

A further object of the invention is to provide mechanism for moving the sole against a stationary splitting knife which mechanism is so arranged that upon completion of the splitting operation the sole is returned to its initial position where it may be readily grasped and removed by the workman.

A further object of the invention is the provision of a clamp for securing and providing a backing for the sole during the slashing operation together with means for automatically releasing said clamp to permit the sole to be fed to the splitting knife and for subsequently disposing said clamp completely out of the path of movement of the sole as the sole is being returned to its initial position.

Other objects and advantages will appear throughout the following description.

In the drawings, wherein we have disclosed a preferred embodiment of the invention, Fig. 1 is a plan view of a sole-splitting and cutting machine constructed in accordance with the invention;

Fig. 6 is a similar view showing the parts in the position which they occupy at the completion of the splitting operation and the time when the sole begins its return travel;

Fig. 7 is a horizontal section taken on approximately the line 7—7 of Fig. 5;

Fig. 10 is a perspective view showing the operations performed on the sole by the machine.

Figure 1:
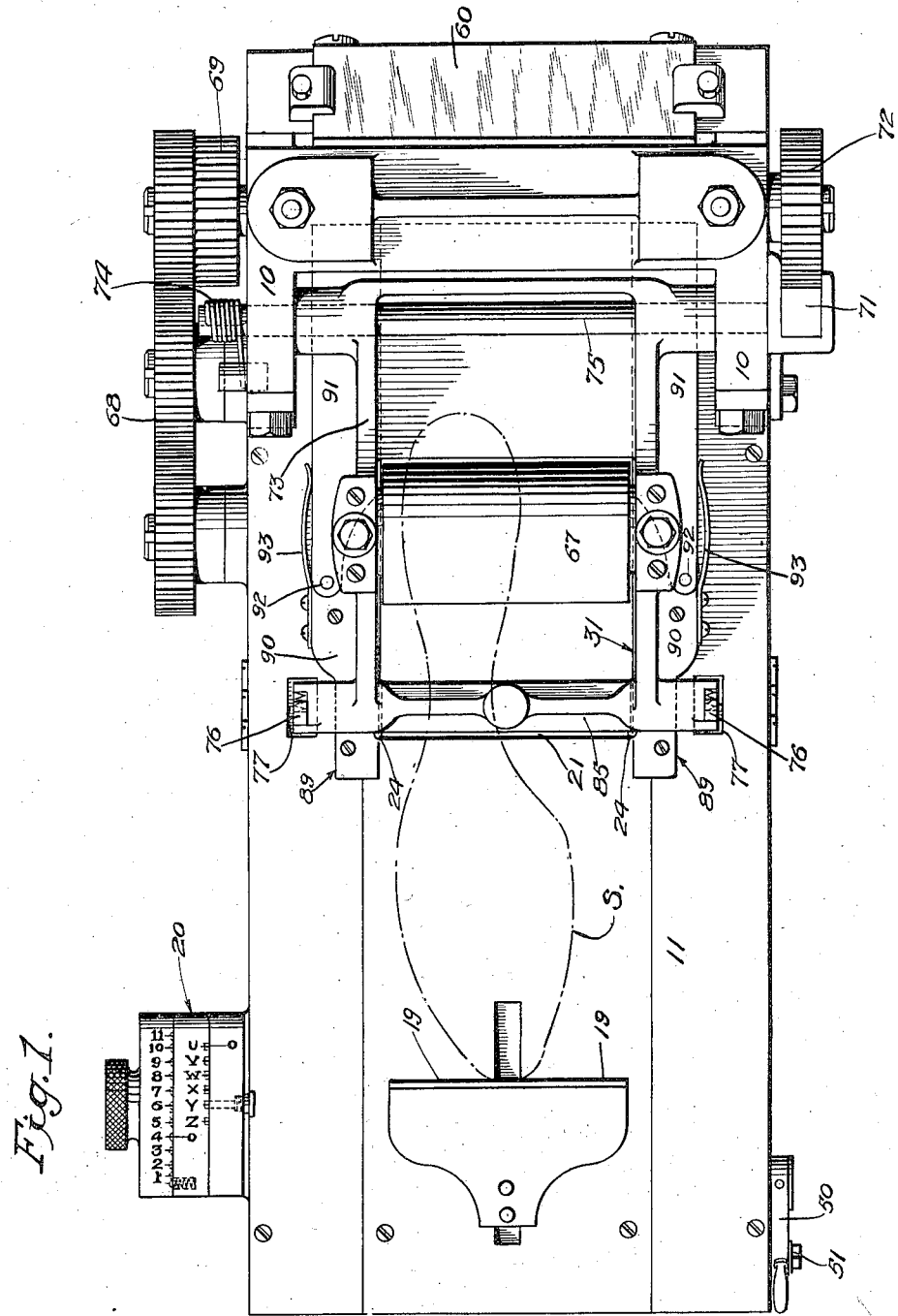
Figure 2:
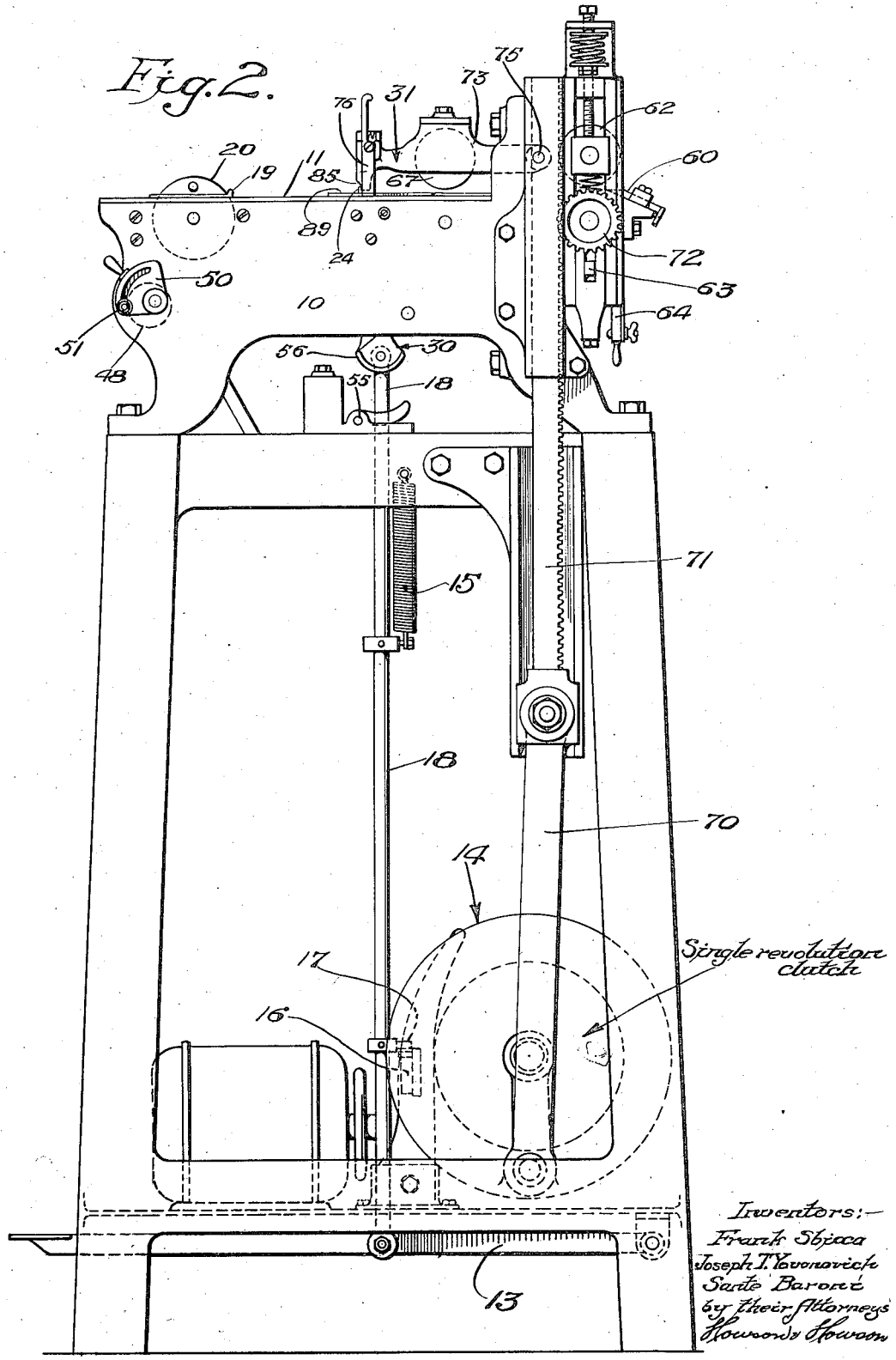
Fig. 2 is a side elevation thereof.
Figure 3:
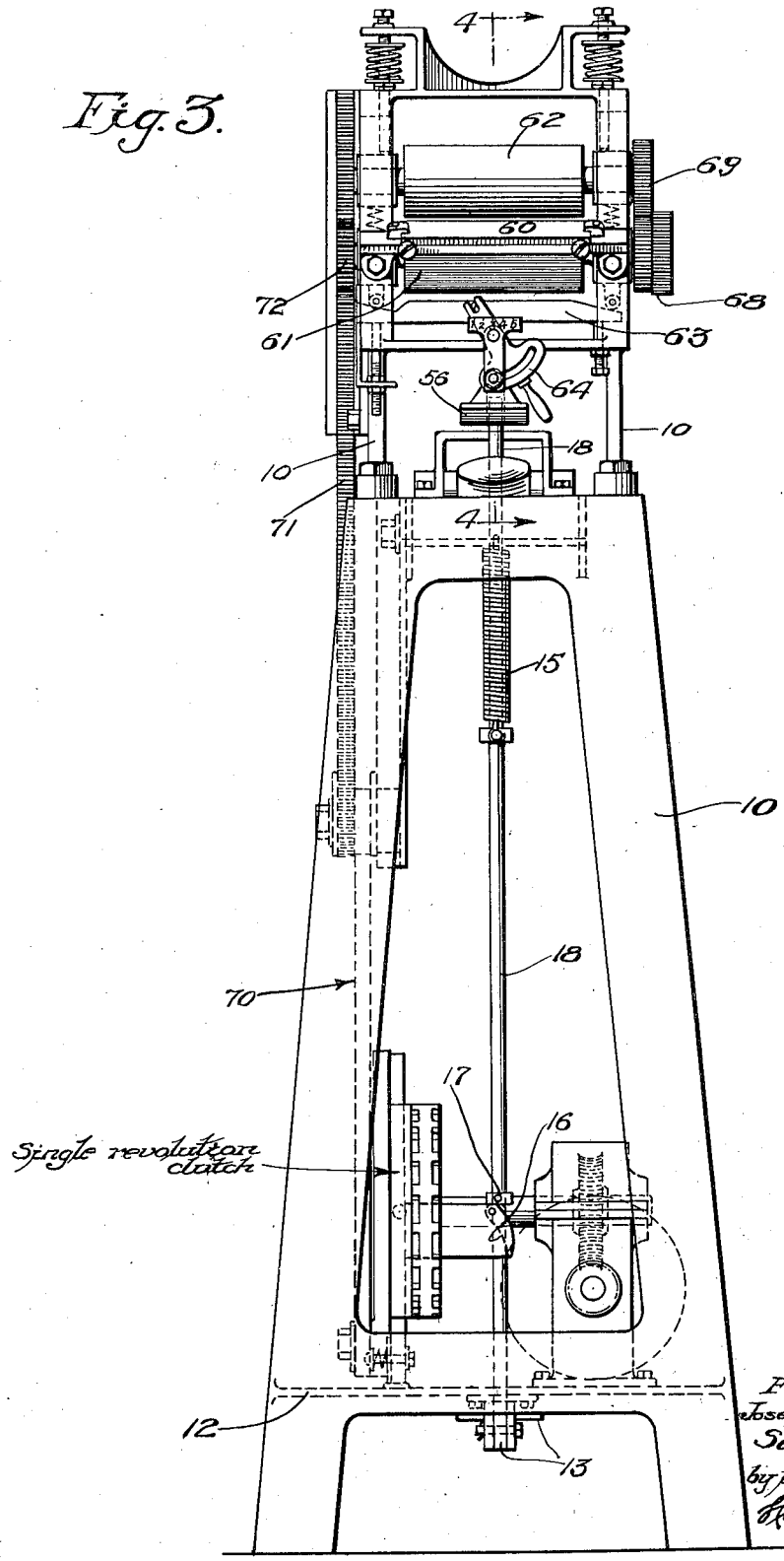
Fig. 3 is a rear elevation thereof.

Referring now more particularly to the drawings, the numeral 10 generally designates a standard embodying upper and lower platforms 11 and 12. The upper platform, between its upper and lower surfaces, mounts the mechanisms for performing the several operations upon the sole while the platform 12 mounts the operating mechanism which comprises a pivoted treadle 13 and a motor-driven single-revolution clutch 14 which is controlled from the treadle 13. The connections between the pedal and clutch are such that when the pedal is depressed the clutch is not operated, but when the pedal returns to its normal raised position, as by means of spring 15, the clutch is tripped. The specific mechanism herein illustrated comprises a dog 16 on the clutch and a pin 17 on a vertically-extending rod 18 connected with the treadle, said pin 17 camming past the dog 16 during its downward movement and engaging this dog to withdraw the usual lock pin of the clutch during its upward movement. The clutch proper may be of any suitable design and any pedal-operated mechanism which will effect the operation of the clutch only when the pedal is released for upward movement may be substituted for that just described.

Figure 5:
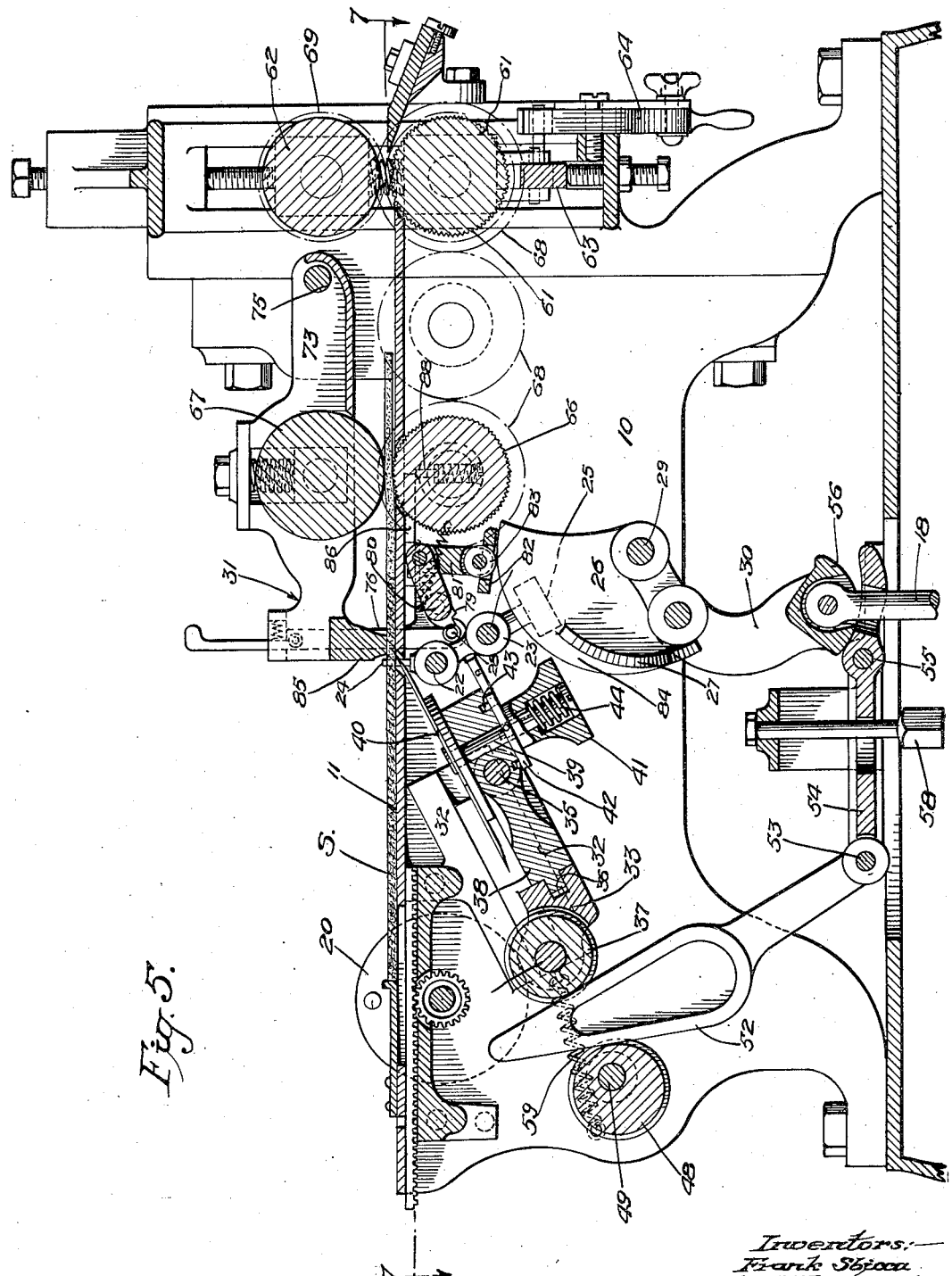
Fig. 5 is a similar view illustrating the position of the parts after completion of the slashing operation and before the control pedal has been released.
Figure 9:
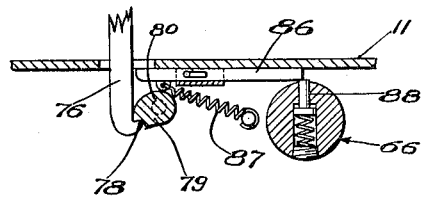
Fig. 9 is a detail view partially in section showing the clamp control and release mechanism.

The platform 11 includes a toe-stop 19 for engagement with the toe of the sole S, this stop being adjustable longitudinally of the platform through the medium of gauge mechanism generally designated at 20. Rearwardly of this gauge, the platform is provided with a transverse slot 21. Beneath this slot, the side walls of the standard are connected by parallel rods 22 upon which are slidably-mounted yoke members 23, the upper ends of which bear pins 24 projecting into the slot, and the lower ends of which are equipped with rollers 25. A pivoted cam element 26 has side cam faces 27 against which rollers 25 are maintained by a spring 28 connecting yokes 23. This cam is pivoted upon shaft 29 and is normally maintained in a position such that the most widely separated portions of cams 27 are disposed between the rollers, thus separating the yokes and their pins to such an extent that the pins are normally located in opposite ends of slot 21, as more clearly shown in Fig. 1. The cam element has connected thereto a link 30 which is, in turn, connected to the upper end of rod 18 and through these connections the cam element is maintained in its normal position just described, or swung about its pivot to the position shown in Fig. 5 as the treadle is depressed. Movement of the cam element to this position permits the rollers to move against the relatively narrow blade forming the rear end of the element so that they may be drawn together by the spring 28. If, however, a sole be disposed upon the upper platform 12 and interposed between the pins, the pins will come into engagement with the side edges of the sole so that at this time the position of the yokes 23 will be determined by the sole which cannot move upon the surface of the platform by reason of the fact that it is engaged by clamping mechanism 31 hereinafter to be more particularly described.

Figure 8:
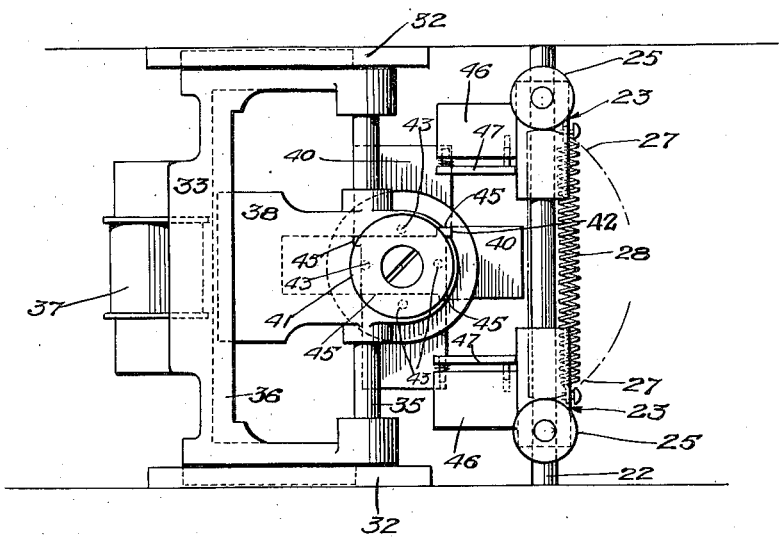
Fig. 8 is a bottom plan view showing the knife carriage and the positioning control therefor.

Mounted upon the inner faces of the sides of standard 10 are upwardly and rearwardly inclining guides 32, which guides mount a carriage 33 including spaced arms 34 connected at their rear ends by a shaft 35 and at their forward ends by a transverse bar 36. Member 36, at its forward face, mounts a roller 37 the purpose of which will presently appear, and at its rear face is formed as a slide guide for a knife-mounting 38, the rear portion of which slidably embraces shaft 35. Directed through the knife-mounting is a shaft 39 the upper end of which has secured thereto a substantially cruciform knife 40 the arms of the cross constituting knife blades of different widths. Splined to the shaft at the under surface of the knife mounting is a nut 41 the upper surface of which comprises a plate 42 having a pin or pins 43 adapted to enter corresponding notches in the under surface of the knife-mounting when the nut is in the normal raised position which it assumes through spring 44. When nut 41 is drawn downwardly against the action of spring 44, the pin and notch engagement is broken so that shaft 39 and the knife 40 may be rotated to bring any desired blade of the knife into a rearwardly directed position, at which position it becomes the effective blade for the cutting operation. Plate 42, as more clearly shown in Fig. 8, has abutment surfaces 45 which are spaced correspondingly to the width of the associated blade, these abutment surfaces being arranged in the path of bumpers 46 carried by the yokes 23, such bumpers being preferably provided with cushion faces as indicated generally at 47. The width of the blade employed in connection with any given sole size is, of course, determined by the width of the sole and the cushion faces 47 of the bumper blocks are so arranged that with any given sole size they will come into engagement with the corresponding abutment faces 45, thus shifting the knife to a position where it lies fairly between the pins 24 which at this time will be engaged against the side edges of the sole so that the knife blade is properly positioned to form a transverse slash centrally between the edges of the sole and at a distance from the toe of the sole which is determined by the position of gauge mechanism 20.

Figure 4:
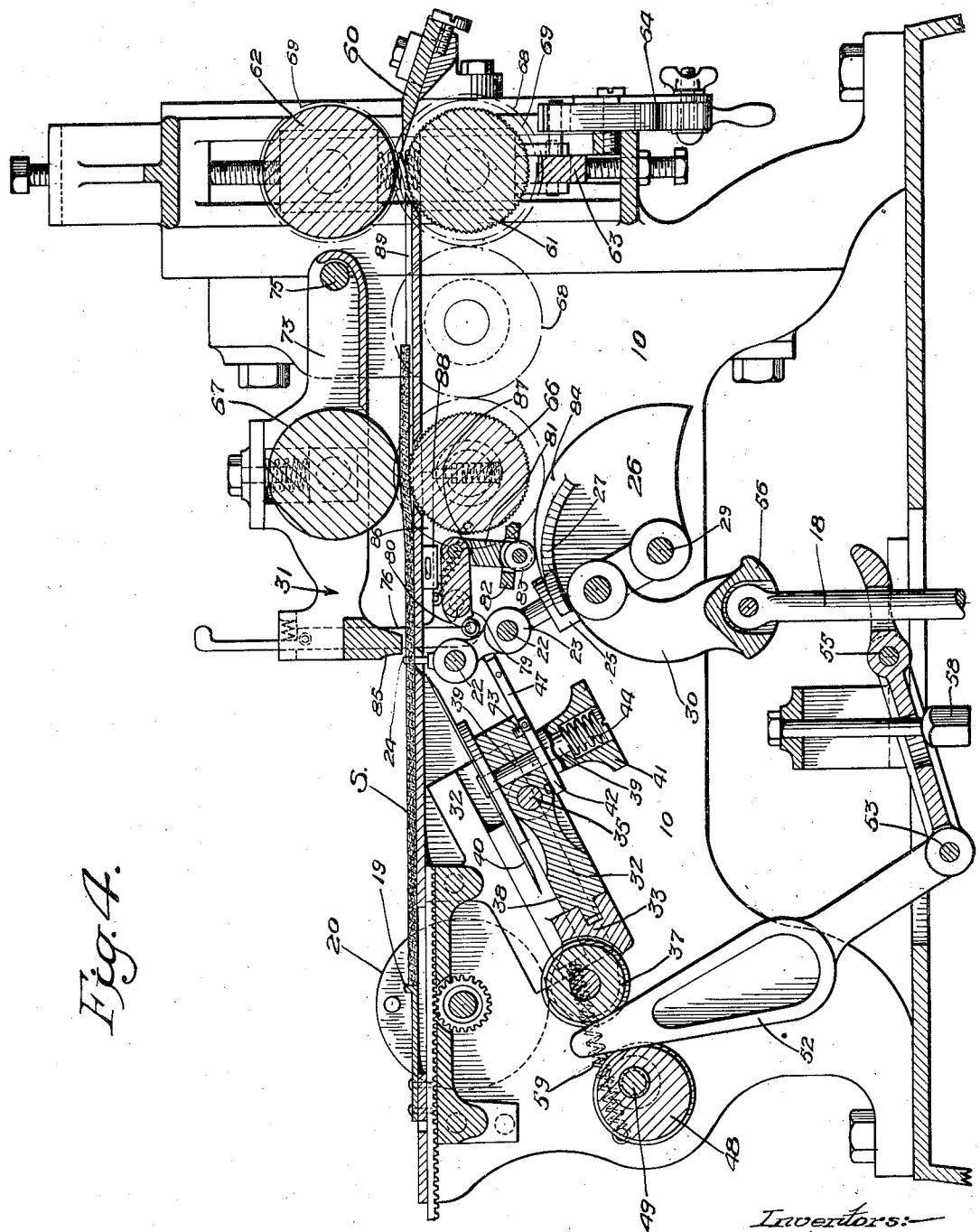
Fig. 4 is a sectional view on line 4—4 of Fig. 3 illustrating the mechanism with the parts in the positions which they occupy immediately after placement of the sole and lowering of the clamp thereagainst.

Opposing the roller 37 of the knife carriage 33 is an eccentric cam 48 secured to a shaft 49 which may be rotatably adjusted through a lever 50 held in adjusted positions as by means of nut 51. Projecting between the cam 48 and the roller is a wedge cam 52, the lower end of which is pivotally connected at 53 to the forward end of a lever 54. This lever rearwardly of the pivot 55 thereof, has an opening through which rod 18 extends and the lower end of link 30 is formed as an abutment 56 adapted to engage against this end of the lever and depress the rear end of the lever after the pedal has been depressed through a predetermined distance. During the treadle depression interval, before engagement of the abutment face 56 with the lever 54, the cam element 26 has been moved from its position of Fig. 4 to that of Fig. 5, and from this position the continued depression of the lever acts to elevate the wedge cam 52, thus driving carriage 33 rearwardly and causing the knife 40 to project a blade thereof through slot 21 and into the sole S arranged upon the platform 11 forming slash 57 (Fig. 10). When the pedal is permitted to elevate, downward movement of the lever is limited by a stop 58 and the carriage 33 is returned to its forward lowered position by means of a spring 59. This same upward movement of the pedal rotates the cam element 26 to place the wider portion of the cam faces 27 between the yokes 23 and thus disengage the pins from the side of the sole, and initiates operation of the single-revolution clutch 14. At the rear of platform 11 there is provided a stationary splitting knife 60 having immediately associated therewith a feed roller 61 and a co-acting pressure roller 62. The feed roller 61 is vertically adjustable with respect to knife 60, being mounted in vertically adjustable bearings supported by a double wedge cam 63. This cam is transversely adjustable to effect vertical adjustment of the feed roller through medium of a pivoted lever 64 having associated therewith a scale by which the extent of adjustment can be determined. This adjustment determines the thickness of the section of the sole which is split from the body of the sole by knife 60 in forming the split 65, Fig. 10. In advance of the rollers 61 and 62 is a pair of feed and pressure rollers 66 and 67, of which the pressure roller 67 is mounted in the movable clamping jaw 31. The feed and pressure rollers 66 and 67 are so disposed that they will engage the heel end of a sole disposed upon the platform 11 and act through the mechanism about to be described to feed it to rollers 61 and 62 and so to the knife. Rollers 61 and 62 are connected by gearing 68 and a driving connection is preferably provided between rollers 61 and 62, as indicated at 69. Through a pitman 70, the single-revolution clutch 14 reciprocates a vertically extending rack 71, which rack meshes with a pinion 72 on the corresponding end of feed roll 61. The length of travel given the rack is such that the feed rollers 66 and 67 advance the sole so that the split 57 formed by the knife 40 coincides with the cutting edge of stationary knife 60, the return motion of the rack effecting a return of the sole to the position in which it was initially disposed.

It will be obvious that a certain amount of pressure must exist between rolls 66 and 67 during this operation and particularly during the feeding operation. It will also be obvious that during the return operation it is essential that the roller 67 be so positioned that it will not interfere with ready return of the sole which may partake of some flexure during a splitting operation. It will, further, be obvious that the sole, during the cutting operation by knife 40 must be securely held down against the platform 11. All of these objects are accomplished through the clamping mechanism 31 and associated control mechanism therefor.

The clamping mechanism proper comprises a pivoted frame 73 connected with the standard 10 through a spring 74 in such manner that it is normally swung about its pivot 75 to the elevated position shown in Fig. 6. The nose of this frame has a pair of uncinate latch bars 76 pivoted thereto which are adapted to pass through openings 77 in platform 11 and engage their hooks 78 beneath pawls 79, which pawls are pivoted at 80 and are adapted to be rocked about their pivots through a link 81 projecting through a guide 82 and equipped with a roller 83 to engage the peripheral cam surface 84 of cam element 26. When the parts are in the position illustrated in Fig. 4, which is their position immediately after placement of a sole upon the platform 11 and lowering of the clamp, it will be noted that the nose 85 of the clamp is spaced from the surface of the sole but that rollers 66 and 67 have pressure engagement with the sole. When the treadle is depressed to cause the knife operation, the rotation of cam element 26 from the position shown in Fig. 4 to that shown in Fig. 5 causes an elevation of the rear ends of pawls 79 and a corresponding depression of the forward ends thereof, which depression brings the nose of the clamp into firm engagement with the sole. Upon release of the treadle, and its elevation, the clamp is again permitted to rise to the position shown in Fig. 4 and simultaneously operation of rollers 61, 62, 66, and 67 is begun, this operation being in the direction to feed the sole rearwardly to knife 60. When the rack has completed its travel and reverse operation of these rollers begins, the latch bars 76 are released through plungers 86. Plungers 86 are normally held in a rearward position by springs 87 and are actuated through yieldably mounted pins 88 in the end of the shaft of feed roller 66. These pins, during rotation of the roller in its feeding operation, withdraw into the shaft to pass the plungers 86. During reverse operation, however, the pins, instead of striking against the under surface of these plungers, engage the ends thereof, driving the plungers forwardly, and thus withdraw the hooks 78 from the pawls so that the spring 74 may elevate the frame and permit the return of the sole to be unobstructed.

It has been found that in some instances, the sole has a tendency to twist slightly. In this event, the engagement of the sole against the side guides 89, which are provided to limit the field within which the sole may be placed, would tend to buckle the sole and cause jamming. For this reason, these side guides are preferably formed in two sections 90 and 91 which are pivotally connected at 92 and are normally held in alignment by means of strong springs 93. The forward sections are rigid to the platform and the rear sections against which engagement, such as above referred to, would occur, are thus free to shift, enabling the sole to return without jamming.

The complete operation of the machine is as follows: Having properly adjusted the toe stop 19, the sole S is placed upon the platform 11 between the side guides 89 and against the toe stop, the hair side of the sole blank being faced upwardly. The knife 40 which has been previously adjusted so that the proper blade thereof is rearwardly directed, is then actuated by depression of the treadle, this depression initially shifting the knife so that it is centrally located with respect to the sole in the manner hereinbefore described, and subsequently actuating the knife through the wedge cam 52. The same depression which causes these operations effects the depression of clamp 31 so that the nose 85 thereof firmly engages the sole and a solid background is provided for the knife during the slashing operation. The pedal, when released, permits the knife to withdraw and effects a separation of the yokes 23 so that the sole is free to move, and at the same time actuates the single-revolution clutch 14, causing rack bar 71 to make one reciprocation. This causes the feed rolls to be actuated, first to move the sole against the knife and cause it to be split, and then to return the sole to approximately its original position. During the return movement, the clamp 31 is released and moved to its elevated position by its spring so that it will not interfere in the return operation.

Since the construction illustrated is, obviously, capable of many variations without in any manner departing from the spirit of our invention, we do not wish to be understood as limiting ourselves thereto except as hereinafter claimed.

We claim:

1. In sole-slashing means, a reciprocating knife carriage, a knife carried thereby and movable transversely of the carriage, and means to engage opposite edges of a sole to be slashed, said means having operative engagement with said knife to shift the same and thereby predeterminedly position the knife with respect to the sole.

2. In sole-slashing means, a bed to support the sole, a pair of yokes slidable transversely of said bed and having portions to engage the side edges of the sole, spring means urging said yokes toward one another, means to hold said yokes in separated relation to permit placement of a sole therebetween, a knife slidable transversely of the bed and reciprocable longitudinally of the bed, and having portions engaged between said yokes whereby it is positioned in a predetermined position with relation to the sole when the yokes are in engagement with the sole, and means to successively release said yokes for engagement with the sole and to actuate said knife to slash the sole.

3. In sole-slashing means, means to support the sole, a reciprocable carriage, a slashing knife thereon, a wedge cam engaging said carriage, a backing means for the wedge cam, means to reciprocate the wedge cam, the backing means comprising a cam, and means to adjust said cam whereby to obtain a variable slash depth.

4. In sole-splitting means, a splitting knife, two pairs of feed and pressure rollers one of which is disposed adjacent the knife and the other of which is spaced therefrom, means to actuate said feed rollers comprising means for alternately rotating the rollers in opposite directions, the rollers during rotation in one direction feeding the sole to the knife, and means to move the pressure roller of the last-named pair to an elevated position when the rollers are operated in the opposite direction.

5. In apparatus of the type described, a slashing knife, a stationary splitting knife, means to operate the slashing knife, a sole support, means to hold a sole stationary upon the support during operation of the slashing knife, means to feed the sole to the splitting means, and means to release said holding means and to actuate the feeding means.

6. In apparatus of the type described, a slashing knife, a stationary splitting knife, means to operate the slashing knife, a sole support, means to hold a sole stationary upon the support during operation of the slashing knife, means to feed the sole to the splitting means, and means to release said holding means and actuate the feeding means actuated as an incident to operation of the operating means for said slashing knife.

7. In apparatus of the type described, a frame, means to clamp a sole blank to the frame, means to form a transverse cut in the blank having its ends spaced from the sides of the blank and defining the junction of the sole and shank sections of the blank, means to split the clamped blank parallel to a face thereof throughout the heel and shank portions to said transverse cut comprising a stationary splitting knife, means to feed the blank to said knife and means to successively operate said cutting and feeding means.

8. In sole splitting mechanism a stationary splitting knife, a gauge against which the sole may be engaged, feed roll mechanism to engage a sole disposed against the gauge, means to successively rotate said feed rolls through predetermined distances in opposite directions, initial operation of the rolls feeding the sole to the splitting means, the feed roll mechanism including primary and secondary feed rolls, and means to separate the primary feed rolls to permit unobstructed passage of the sole therebetween when the direction of rotation of the rolls is reversed.

9. In sole-splitting means, a splitting knife, two pairs of feed and pressure rollers one of which is disposed adjacent the knife and the other of which is spaced therefrom, means to actuate said feed rollers comprising means for alternately rotating the rollers in opposite directions, the rollers during rotation in one direction feeding the sole to the knife, and during rotation in the opposite direction positioning the sole for removal and replacement.

10. In sole-splitting means, a splitting knife, two pairs of feed and pressure rollers one of which is disposed adjacent the knife and the other of which is spaced therefrom, means to actuate said feed rollers comprising means for alternately rotating the rollers in opposite directions, the rollers during rotation in one direction feeding the sole to the knife, and during rotation in the opposite direction positioning the sole for removal and replacement, and means to move the pressure roller of the last-named pair to an elevated position when the rollers are operated in the opposite direction.

11. A device as claimed in claim 6 wherein the holding means comprises a clamp jaw movable into and out of cooperative relation with the sole support and the feeding means includes a pressure roller carried by said clamp jaw.

12. A device as claimed in claim 6 wherein the holding means comprises a clamp jaw movable into and out of cooperative relation with the sole support and the feeding means includes a pressure roller carried by said clamp jaw, and means to limit the movement of the holding means when released to maintain said pressure roller in engagement with a sole being operated upon.

13. In apparatus of the type described, a frame, means to clamp a sole blank to the frame, means to form a transverse cut in the blank having its ends spaced from the sides of the blank and defining the junction of the sole and shank sections of the blank, means to split the clamped blank parallel to a face thereof throughout the heel and shank portions to said transverse cut, comprising a stationary splitting knife, means to feed the blank to said knife, a member movement of which in one direction operates said cutting means, and movement of which in the opposite direction initiates operation of said feeding means.

14. In sole-slashing means a sole support, a reciprocating carriage moving toward and away from a sole disposed upon said support, a knife support mounted upon the carriage and movable transversely thereof, a knife rotatably positioned upon said carriage and having a plurality of radial blades of varying widths, means to rotatably adjust said knife and maintain said knife in rotatably adjusted positions, a pair of members movable transversely of the sole support and adapted to engage opposite sides of a sole disposed thereon, yieldable means urging said sole-engaging means toward one another, and means on said sole-engaging means to engage said knife support and move it upon the carriage until the operative blade thereof properly aligns with a sole engaged by said sole-engaging means.

15. In sole-slashing means a sole support, a reciprocating carriage moving toward and away from a sole disposed upon said support, a knife support mounted upon the carriage and movable transversely thereof, a knife rotatably positioned upon said carriage and having a plurality of radial blades of varying widths, means to rotatably adjust said knife and maintain said knife in rotatably adjusted positions, a pair of members movable transversely of the sole support and adapted to engage opposite sides of a sole disposed thereon, yieldable means urging said sole-engaging means toward one another, means on said sole-engaging means to engage said knife support and move it upon the carriage until the operative blade thereof properly aligns with a sole engaged by said sole-engaging means, means normally separating said sole-engaging means to permit ready disposition of the sole upon the support therebetween, and means to successively withdraw said separating means and actuate said carriage toward the sole disposed upon the support.

16. A device as claimed in claim 5 wherein the holding means includes a movable member and the feeding means comprises a pressure roller carried by said movable member.

17. In sole-splitting means, a splitting knife, two pairs of feed and pressure rollers one of which is disposed adjacent the knife and the other of which is spaced therefrom, means to actuate said feed rollers comprising means for alternately rotating the rollers in opposite directions, the rollers during rotation in one direction feeding the sole to the knife, yieldable means tending to separate the rollers of the last-named pair, latch means preventing said rollers from movement out of sole-clamping position, and means operative upon rotation of the rollers in a direction opposite to the sole-feeding direction for releasing said latch means.

18. In sole slashing means, means to support the sole, a reciprocable carriage, a slashing knife thereon, a wedge cam engaging said carriage, backing means for the wedge cam, and means to reciprocate the wedge cam, the backing means being adjustable in the direction of reciprocation of the carriage.

FRANK SBICCA.
JOSEPH T. YOVANOVICH.
SANTE BARONI.